April 24, 1962

R. H. GILL 3,030,705

METHOD OF SECURING A STRUCTURE TO A
TUBULAR RIVET IN APERTURED WORK

Original Filed Nov. 30, 1954

INVENTOR.
RAY H. GILL
BY Dwight L. Moody

ATTY.

INVENTOR.
RAY H. GILL
BY Dwight L. Moody
ATTY.

United States Patent Office 3,030,705
Patented Apr. 24, 1962

3,030,705
METHOD OF SECURING A STRUCTURE TO A TUBULAR RIVET IN APERTURED WORK
Ray H. Gill, Akron, Ohio, assignor to The B. F. Goodrich Company, New York, N.Y., a corporation of New York
Continuation of application Ser. No. 471,990, Nov. 30, 1954. This application Mar. 5, 1958, Ser. No. 787,319
2 Claims. (Cl. 29—526)

The invention relates to expansible hollow rivets with self-locking means and especially to internally threaded expansible tubular rivets capable of self-locking engagement with an article-attaching screw threaded fastener. More particularly, the invention relates to the method of securing a structure to such a tubular rivet in apertured work by operation from one side only of the work.

This application is a continuation of my copending application Serial No. 471,990, filed November 30, 1954, now abandoned, wherein the expansible hollow rivet structure itself is claimed.

Heretofore, internally threaded rivets of the non-locking type such, for example, as the kind shown in the Patent No. 2,149,199 to Harry E. Waner, dated February 28, 1939, have been attached to apertured work by operation from one side only of the work, and have been used to secure an article or structure to the work at said one side thereof by virtue of a uniformly threaded screw fastener extending through the structure and detachably engaging the internal threads of the rivet. However, the connection between the rivet and the screw fastener has tended to loosen objectionably under relative vibratory or other movements of the work and the structure, thereby reducing the security of the attachment of the structure to the work. The expedient of a lock washer under the head of the screw fastener or of a lock nut engaging the screw fastener at the other side of the work has generally been objectionable because of increased cost and number of parts of the attachment, and because in some applications, it has been impossible to apply a lock nut to the screw fastener at the other side of the work.

Nevertheless, internally threaded rivets of the non-locking type shown in the said Waner Patent No. 2,149,199 have been recognized for years as generally satisfactory and commercially acceptable for numerous industrial constructions such, for example, as aircraft structures. The industrial usage of these rivets has resulted in commercially accepted standards and specifications being established and used for the purchasing of the rivets by the trade. The standards and specifications have included the materials, types of head, and specific dimensions of the various standard rivet sizes, which dimensions have included, for example, the outside diameter and the standard overall length of the rivet shank, and also the size and minimum number of complete or full internal thread convolutions. The normal length of the shank establishes largely the extent to which the shank projects from the back of the work when a particular size rivet is upset and attached to the work, which extent of projection can be of vital importance where space is limited in the work to be riveted. The standard minimum number of complete or full thread convolutions is essential for load-carrying purposes and also to resist stripping of the threads during the desired upsetting of the rivet. Hence, it is not only desirable but essential that internally threaded tubular rivets having a self-locking feature conform generally to the standard specifications, especially in respect of the overall length of shank and as to the minimum number of full thread convolutions called for in the standard commercial rivets of the non-locking type.

Objects of the invention are to overcome the foregoing and other difficulties and disadvantages of the prior rivet constructions, and to provide for an improved internally threaded tubular rivet having provision of internal self-locking means for engagement with an externally threaded article-attaching fastener, and to provide for an improved method of securing a structure to such a tubular rivet in apertured work by operation from one side only of the work.

Other objects of the invention are to provide for an integral one-piece hollow rivet construction meeting commercial standards as to size and length yet incorporating internal thread means for jamming or self-locking against the end thread convolutions of the threaded fastener; to provide for a standard number of full thread convolutions including said self-locking thread means throughout an internally threaded portion of the rivet so that all the thread convolutions constitute load-carrying means; to provide for applying upsetting force axially to the rivet through all the internal thread convolutions thereof; to provide for reducing the pitch diameter but maintaining the pitch and basic shape of one or more internal full thread convolutions of the rivet at one end of the threaded portion thereof; to provide for reducing the inside diameter or the outside diameter or both and the pitch diameter of internal full thread convolutions at an end of the threaded portion of the rivet; to provide for gradually or for uniformly reducing the outside diameter and the pitch diameter of internal thread convolutions at an end of the threaded portion; and to provide for simplicity of construction, convenience of manufacture and effectiveness of operation.

These and other objects and advantages of the invention will be apparent from the following description.

In the accompanying drawings which form a part of this specification and in which like numerals are employed throughout to designate like parts, FIG. 1 is a view showing an internally threaded tubular rivet of the non-locking type and substantially uniform outside diameter, parts being shown in section;

Figure 2:
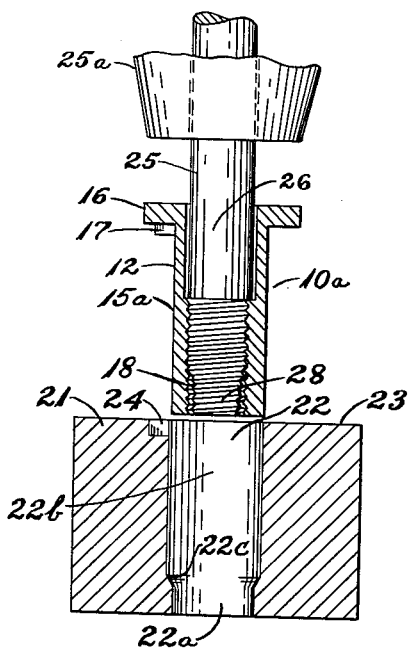
FIG. 2 is a sectional view showing apparatus for altering the rivet shown in FIG. 1 to a rivet of the locking type and constructed in accordance with and embodying the invention.

In the illustrative embodiment of the invention shown especially in FIGS. 1 to 5, the rivet construction includes a tubular body of the rivet 10 having a bore 11 therein of stepped diameter to provide in the shank of the rivet an outwardly expansible portion 12 of relatively thin, substantially uniform wall thickness extending axially away from a head end 13 of the body toward the other end 14 thereof and terminating at a tool-engaging or fastener-engaging portion 15 of relatively thicker, substantially uniform wall thickness extending desirably to said other end 14 of the shank. The tubular body of the rivet 10 is made of stiff expansible or deformable material capable of limited permanent compression or deformation and of effecting elastic resistance to return from the compressed state, and also capable of bending under the application of axial force to the body. The expansible material may be a metal alloy such, for example, as aluminum, steel, brass and other suitable metal, or of suitable stiff plastic material of the thermoplastic type having the aforesaid compression and bending characteristics of the tubular body material. The tubular body of the rivet 10 may have a radial outward-extending flange or flat head 16 or other suitable shaped head at its head end 13, and is provided with means such, for example, as a suitable key 17 at the flange for preventing relative rotation between the rivet and the work 40 to which the rivet is to be attached.

Figure 4:
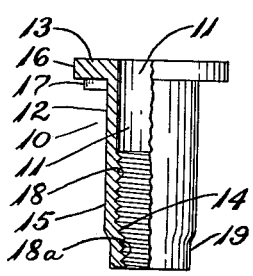
FIG. 4 is a view partly in section showing the locking type rivet after it has been removed from the apparatus and before it has been upset in the work.

The tool-engaging portion 15 of the continuous annular wall at the smaller diameter bore in the tubular body of the rivet 10 has throughout the axial extent of the portion, circumferentially and axially continuous, load-carrying internal screw thread convolutions 18 of uniform pitch or lead throughout and preferably of the Sellers or United States i.e. National Standard 60° V-type. The tool-engaging portion 15 includes a relatively short jamming end portion 19 of reduced outside diameter (about several thousandths of an inch) as compared to that of the remainder of the shank of the rivet in continuation of and merging smoothly with the remainder of the shank, so that at least one full load-carrying thread convolution is and preferably not less than two full load-carrying thread convolutions 18a are of reduced outside and pitch diameter and extend circumferentially continuous and in unbroken continuation of the plurality of greater diameter full thread convolutions nearest the outwardly expansible portion 12 of the shank. The thread convolutions 18, 18a are in continuation of one another and undistorted as shown in FIGURE 4, and have sufficient combined length so that the shear strength of the total number of thread convolutions 18, 18a exceeds the axial force required to expand the expansible portion 12 by engagement of a threaded tool or draw rod 25 extending entirely through the internally threaded portion (15, 19) of the rivet. The term "full thread convolution" designates a complete circle continuous thread convolution conforming in at least basic cross-sectional shape and the angularity of the sides of the thread relative to the axis of the thread, and in pitch or lead but not necessarily conforming in depth and in width of flats or lands to those normally specified for Sellers or U.S. Standard 60° V-type threads. The continuous annular wall of the tool-engaging portion 15 is substantially uniform in thickness even though that part 19 of such portion 15 remote from the head end 13 has been reduced in outside diameter as by several thousandths of an inch to provide full end thread convolutions of rduced outside or major or root diameter and reduced pitch diameter but of the same basic cross-sectional shape and same angularity of the sides of the thread relative to the axis of the thread and same pitch as the remainder of the thread convolutions 18. Thus, the tool-engaging portion 15 terminates in an internally threaded end portion 19 of reduced outside diameter which constitutes the self-locking means or the jamming end portion 19 of the integral one-piece improved tubular rivet 10. The amount of reduction in outside diameter of the end portion 19 of the rivet and of the preferred two or more internal end threads 18a is not only several thousandths of an inch but varies slightly according to the material of the rivet and also the size and the number of thread convolutions per inch provided in the bore 11 of the rivet.

The improved tubular rivet having the shank with the self-locking or jamming end portion 19 is shown in FIG. 4 before being expanded and upset in the work 40. However, for illustrative purposes the functioning of the self-locking rivet 10 including its jamming end portion 19 will be described only for the upset condition shown in FIG. 5. When a screw threaded fastener 20 having all its standard screw thread convolutions of uniform outside diameter, pitch diameter, pitch, depth and shape is disposed through an article or structure 41 and is inserted through the head end 13 into the bore 11 in the upset rivet, the screw fastener can be initially freely turned with ordinary force until it detachably engages, that is without objectionable binding, the major portion of the relatively large diameter internal thread convolutions 18 in the tool engaging portion 15, after which the fastener 20 must be turned with increased force in order to threadedly and jammingly i.e., bindingly engage the end thread convolutions in the jamming end portion 19 because of the interference they offer due to their reduced, substantially uniform root or major or outside and minor or inside diameter and pitch diameter as compared to those of the relatively larger diameter threads of the fastener 20. Upon applying sufficient turning force to the screw threaded fastener, the relatively larger diameter end thread convolutions thereof can be forced into threaded jammed engagement with the reduced diameter internal thread convolutions 18a of the jamming end portion 19. This compels a slight circumferential and radially outward expansion of the continuous, annular, uniform thickness wall of the reduced end portion 19 to approximately its original condition shown in FIG. 1 but not beyond the elastic limit of the material of said wall, and at the same time, the reduced diameter internal end thread convolutions 18a elastically bind or jam or grip tightly against the threaded fastener 20 and retain such grip by virtue of the residual elasticity of the material of the body of the rivet 10. This locks together the improved rivet 10 and the threaded fastener 20 and prevents effectively any accidental loosening of the locked connection under relative vibratory or other movements of the work 40 and the structure 41.

Since the internal end thread convolutions 18a are of standard basic shape and pitch and angularity of the sides of the thread relative to the axis of the thread, but of reduced, substantially uniform, outside or root diameter and reduced pitch diameter, they effect continuity of substantially uniform, elastic jamming or locking or gripping against the corresponding but larger diameter standard end thread convolutions of the fastener 20 throughout the axial extent of the jamming end portion 19 of the rivet. In this manner the invention provides effectively for inherent frictional resistance of the improved expansible, tubular rivet 10 to accidental or other undesirable loosening of the locked connection between the assembled rivet and screw threaded fastener, without requiring the use of lock washers and the like.

Figure 1:
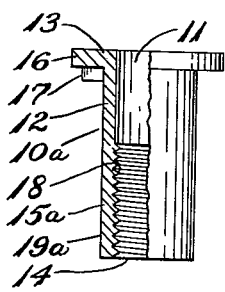

The improved tubular rivet shown in FIG. 4 can be made advantageously in accordance with the method aspects of the invention, by altering a previously commercially produced, standard stock rivet 10a having the standard number of interval thread convolutions adapted to resist stripping of the threads and shown in FIG. 1, the standard stock rivet 10a being of the non-locking type shown in the Waner Patent 2,149,199. The standard stock rivet 10a may be made by the method steps of providing a solid or tubular rivet blank of suitable metal material, for example, and of determinate length and substantially uniform outside diameter, forming a flange or head 16 and desirably a key 17 on one end of the rivet blank, applying a tap drill to the headed rivet blank so as to form a relatively small substantially uniform diameter bore extending axially therethrough, applying a counterbore drill to the headed rivet blank so as to provide a relatively larger, substantially uniform diameter bore at the thin-walled, outwardly expansible portion 12 extending axially away from the head 16 to the thicker-walled tool-engaging or fastener-engaging portion 15a, and forming or tapping standard screw thread convolutions 18 in the internal wall in the smaller, substantially uniform diameter bore of the tool-engaging portion.

To the end of producing the improved tubular rivet 10 from the standard stock rivet 10a formed in the manner described hereinabove, the invention provides apparatus 21 and 25 shown in FIGS. 2, 3 and 6. The apparatus includes suitable means 21 for applying force to the material such, for example, as aluminum alloy of the stock rivet shank laterally or radially inward thereof and circumferentially continuous about the continuous wall of the shank at a position or narrow region in the internally threaded tool-engaging portion 15a remote from the outwardly expansible portion 12, and desirably at an end portion 19a of the stock rivet. The means 21 for applying the radially inward, circumferentially continuous force is preferably a female die block of steel alloy or other suitable hard metal material having a thickness or depth at least equal to the length of the shank of the stock rivet 10a shown in FIG. 1. The die block is adapted to be mounted upon a suitable support means (not shown).

The female die block 21 has a bore 22 extending therein from a face 23 thereof to a depth not less than the length of the shank of the stock rivet. The bore 22 is of substantially uniform diameter throughout the major portion 22b of its axial length and terminates at a position remote from the face 23 in a short bore 22a of slightly reduced, substantially uniform diameter. The amount of reduction in diameter of the bore 22a is several thousandths of an inch and the axial extent of the reduced bore 22a corresponds to the axial extent of the reduced end portion 19 of the improved tubular rivet 10 shown in FIG. 4. The internal wall in the large diameter portion 22b of the bore 22 is arranged for a snug sliding fit with the continuous, annular, uniform diameter wall of the shank of the stock rivet.

The die block 21 arrangement provides advantageously for effecting external guiding and backing support of the shank wall of the stock rivet so as to resist objectionable outward distortion or bulging of the shank wall during the reducing operation. The large diameter portion 22b of the bore 22 merges smoothly and gradually with the reduced diameter end portion 22a of the bore 22 so as to provide an annular shoulder or abutment 22c of tapered or rounded or reversely curved or other suitable section in the internal wall of the die block, and this construction advantageously avoids setting up objectionable shear stresses in the metal material of the stock rivet 10a where its end portion 19a is to be reduced in outside diameter. Also, the construction at the junction of the large diameter 22b and small diameter 22a portions of the bore 22 facilitates cold-flow and work-hardening of the metal material of the stock rivet under compressive force applied through the shoulder 22c radially inward and circumferentially continuous against the wall of the shank. The die block at its face 23 may, if desired, be provided with a slot 24 adapted to receive the key 17 of the stock rivet 10a.

The apparatus for altering the stock rivet 10a includes suitable force-producing means 25a of the power or the manual type operatively associated with a screw threaded tool 25 of suitable steel alloy or other hard strong metal material so as to effect axial movement of the tool 25. The stock rivet 10a is adapted to be mounted threadedly upon a rivet-engaging portion of the tool in telescopic overlapping relation thereto as shown in FIG. 2. The tool 25 may be of solid metal (steel) construction and has a rod-like body with a smooth upper stem portion 26 of substantially uniform diameter for extending into and through the counterbore region of the stock rivet with the wall of the stem portion 26 in closely adjacent, internal backing relation to the thin wall of the outwardly expansible portion 12 to resist radially inward bending of said thin wall.

Figure 6:
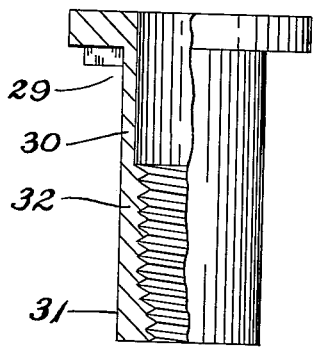
FIG. 6 is a view partly in section and in an enlarged scale showing a threaded tool adapted for making or for detachably engaging and upsetting the rivet shown in FIG. 4.

The body of the tool 25 has at its rivet-engaging portion of suitable length, a plurality of external full thread convolutions 27 extending in continuation of one another continuously from the smooth stem portion 26 to substantially the end 25a of the tool, all of which thread convolutions 27 are full thread convolutions preferably of the Sellers or United States i.e. National Standard 60° V-type as shown in FIG. 6. The axial extent of the externally threaded portion of the rod-like body of the tool 25 substantially corresponds to the axial extent of the internally threaded portion 15a of the stock rivet 10a. The external full thread convolutions 27 nearest the stem portion 26 are of substantially uniform outside diameter, pitch diameter, and pitch for full engagement with the internal thread convolutions 18 of the stock rivet; and at least one and preferably two or more full end thread convolutions 27a are of relatively reduced (about several thousandths of an inch), substantially uniform outside diameter and reduced pitch diameter but the same pitch and angularity of the sides of the thread relative to the axis of the thread and same basic cross-sectional shape at the free end portion 28 of the tool 25 for partial engagement with at least one and preferably two or more full end thread convolutions 18 of the stock rivet so as to provide greater than standard clearance therebetween. The free end portion 28 having the reduced diameter external thread convolutions 27a has an axial extent at least equal to that of the reduced end portion 19 of the improved tubular rivet shown in FIG. 4.

It will be noted that when the standard stock rivet 10a is mounted in an unheated condition on the tool 25 as shown in FIG. 2, the several end thread convolutions 18 adjacent the end 14 of the stock rivet 10a are in circumferentially continuous, spaced-apart relation to the reduced diameter external end thread convolutions 27a of the tool 25. The slight radial and continuous circumferential clearance between the overlapping end thread convolutions 18 and 27a of the stock rivet 10a and the tool 25, respectively, makes feasible compressing or squeezing the unheated metal material of the end portion 19a of the stock rivet shank beyond its elastic limit and sufficiently to reduce uniformly the outside diameter of such end portion 19a and of the internal end thread convolutions 18 about several thousandths of an inch by virtue of cold-flow of the metal material of the stock rivet shank, when the stock rivet 10a and tool 25 assembly is compelled to move axially inward in the bore 22 and beyond the annular shoulder 22c of the die block 21. This deforms and presses laterally or radially inward the internal end thread convolutions 18 of the stock rivet 10a matingly and fully against the reduced diameter end thread convolutions 27a of the tool 25 as shown in FIG. 3.

The desired limited reduction in diameter of the end portion 19a and the internal full end thread convolutions of the standard stock rivet 10a may be accomplished with the rivet mounted telescopically on the tool 25 as shown in FIG. 2, by the method step of moving axially the assembled tool and stock rivet toward and into the larger diameter bore portion 22b of the supported die block 21, or by the method step of moving the die block and also the assembled tool and stock rivet toward one another so as to position the rivet in the said bore portion 22b of the die block. In the first of such method steps, for example, when the assembled tool and rivet has moved axially to position the rivet end 14 abutting against the annular reversely curved in section shoulder 22c so that the internal wall in the upper bore portion 22b of the die block 21 backingly supports the wall of the rivet shank, sufficient additional axial force, produced by said suitable means 25a, is applied through the tool 25 to the internally threaded portion 15 of the stock rivet 10a to compel further axial movement of the rivet and tool assembly past the shoulder 22c into and through the reduced diameter lower bore portion 22a of the die block. The reactionary, laterally or radially inward and circumferentially continuous force is applied to the rivet shank wall by the internal wall in the reduced diameter bore portion 22a of the die block concurrently with the axial force applied through the tool 25 to the shank of the stock rivet 10a, all of which produces the desired limited compression and cold-flow of the metal material at the end portion 19a of the stock rivet. This compels the internal end thread convolutions 18 in the rivet to conform and seat fully against the reduced diameter external thread convolutions 27a in the end portion of the tool 25 so as to maintain the shape and pitch but reduce the pitch diameter and root diameter of the end thread convolutions 18; at the same time, this also reduces the outside diameter of the short end portion 19a of the standard stock rivet 10a as shown in FIG. 3. For effecting the required axial movement and force, the threaded, tool 25 is removably connected to the force-producing means 25a, the details of which constitute no part of the invention.

Figure 3:
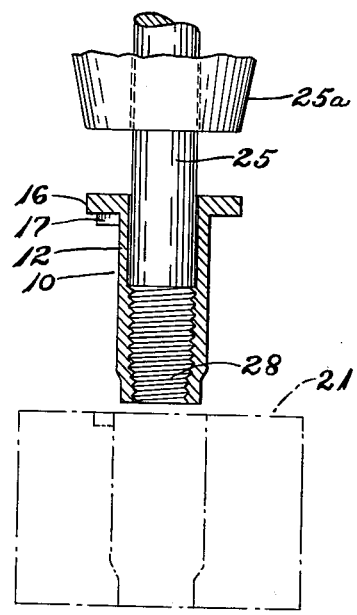
FIG. 3 is a sectional view showing the rivet of FIG. 1 after it has been altered to the locking type and removed from a forming die of the apparatus shown in broken lines.

After the limited reduction of both the end portion 19a and the internal end thread convolutions 18 of the stock rivet 10a has been accomplished to alter the stock rivet to provide the improved self-blocking tubular rivet 10, the tool 25 and the rivet in its altered form are withdrawn as a unit entirely from the bore 22 in the die block 21 as shown in FIG. 3 and the improved self-locking tubular rivet 10 is readily disengaged from the tool 25 as by unscrewing the rivet therefrom.

For illustrative purposes but not necessarily limited thereto, one particular size of standard stock rivet of aluminum alloy constructed and arranged as shown in FIG. 1 has the following commercially accepted standard structural specifications:

(1) Thickness of the flat head 16 in inches—$\frac{1}{32}$.
(2) Length of the tubular shank extending away from the head 16 to the other end 14 in inches—$\frac{7}{16}$.
(3) Outside diameter of the tubular shank in inches—$\frac{3}{16}$.
(4) Number of full thread convolutions 18 in the internally threaded portion 15a of the shank—not less than 8.
(5) Size and kind of threads—#6—32 Sellers or U.S. Standard 60° V-type.

After this particular size of standard stock rivet has been altered to the construction and arrangement shown in FIG. 4 by means of the method steps and the apparatus described hereinabove, it now constitutes the improved self-locking tubular rivet which has the following structural specifications:

(1) Thickness of flat head—same as the stock rivet ($\frac{1}{32}$).
(2) Length of tubular shank—same as the stock rivet ($\frac{7}{16}$).
(3) Number of full thread convolutions—same as the stock rivet (not less than 8).
(4) Size and kind of threads—same as the stock rivet (#6—32 U.S. Standard).
(5) Outside diameter of tubular shank except its end portion 19—same as the stock rivet ($\frac{3}{16}$).
(6) Outside diameter of the reduced end portion 19 in inches 0.181 nominal.
(7) Length of reduced end portion 19 from beginning of its reduction to its free end in inches—about 0.090.
(8) Number of reduced diameter full thread convolutions in end portion 19—not less than 2.

Although the same threaded tool 25 used for making the rivet 10 can also be used to upset the altered rivet, it is preferred to provide an independent draw rod for upsetting purposes, and having standard thread tolerance for freely turning in the improved self-locking tubular rivet 10. Such a draw rod is constructed as to its stem portion and its threaded portion as shown in FIG. 6 and in the manner described hereinabove for the threaded tool 25, and the said draw rod has at its other end suitable means (not shown) for removable attachment to an upsetting tool such, for example, as the tool shown in Patent No. 2,069,907 to Harry E. Waner, dated February 9, 1937. Thus either the threaded tool 25 or the independent draw rod of substantially like construction constitutes a threaded tool adapted for making or for detachably engaging and upsetting the improved tubular rivet.

Figure 5:
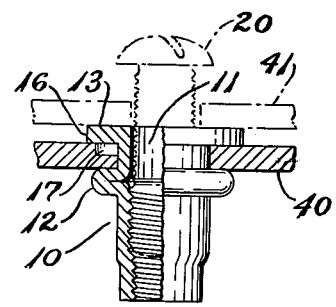
FIG. 5 is a sectional view showing the rivet upset in the work and a threaded fastener extending through a structure and into the rivet and also showing a jamming end portion of the rivet shank before its engagement with the threaded fastener, the structure and threaded fastener being shown in broken lines.

To outwardly bulge or expand the expansible portion 12 and attach the improved self-locking rivet 10 in the work by operation from one side only of the work i.e. "blind riveting," the draw rod is inserted from the head end 13 into the rivet 10 and engaged with both sets of internal thread convolutions 18, 18a. The external thread convolutions 27, 27a of the draw rod detachably and freely engage, that is without objectionable binding, all the internal thread convolutions 18, 18a of the tool-engaging portion 15 of the improved self-locking rivet. Thus, all the internal thread convolutions 18 and 18a of the improved self-locking tubular rivet are load-carrying elements and all are utilized in applying axial force from the draw rod through the tool-engaging portion 15 to the outwardly expansible portion 12 so as to bulge and fold the outwardly expansible portion into the form of an annular holding flange against the back of the work as shown in FIG. 5. After the upsetting, the draw rod is conveniently unthreaded from the threads 18, 18a and removed from the improved rivet, leaving the reduced diameter end convolutions 18a undistorted.

Figures 7, 8:
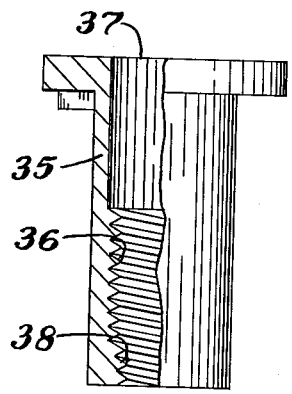
FIG. 7 is a view partly in section showing a modification of the rivet shown in FIG. 4.
FIG. 8 is a sectional view in an enlarged scale showing a further modification of the rivet shown in FIG. 4, parts being broken away.

A modified self-locking tubular rivet construction 29 shown in FIG. 7 differs from the improved self-locking tubular rivet 10 shown in FIG. 4, in that the shank 30 of the rivet is of substantially uniform diameter throughout including its end portion 31, and in that the wall of the tool-engaging or fastener-engaging portion 32 instead of being of uniform thickness throughout is of increased thickness at the end portion 31, hence increased resistance to outward distortion or expansion. However, the internal thread diameter arrangement of the modified rivet 29 corresponds to the internal thread reduced outside, inside, and pitch diameters but same pitch and basic shape arrangement of the improved rivet 10, whereby the modified rivet 29 requires a draw rod having the threaded end construction shown in FIG. 6, that is, the same draw rod may be used to upset either the improved self-locking rivet 10 or the modified self-locking rivet 29.

For making the modified rivet 29 a suitable solid or tubular rivet blank is formed with a bore of stepped diameter having the bore portion of largest diameter providing a counterbore at the head end of the rivet, and having a bore of reduced diameter at an intermediate region 32 of the rivet, and also having a bore of still further reduced diameter at the end portion 31 of the rivet. Then suitable standard thread convolutions of substantially uniform, inside and outside or root and pitch diameter are formed in the intermediate portion 32 of the rivet and a continuation of such thread convolutions as to shape and pitch but of reduced, substantially uniform inside and outside or root diameter and reduced pitch diameter is formed throughout the end portion 31 of the rivet to provide therein preferably at least two full thread convolutions. This step of forming all the said thread convolutions can be accomplished as by the use of a suitable specially ground thread tap constructed substantially like the threaded tool 25 shown in FIG. 6.

In the modified self-locking rivet 29 the standard threaded fastener 20 for article attaching purposes can be threadedly engaged and locked by jamming against the end thread convolutions in the rivet in a manner like that of the improved self-locking rivet 10, but such engagement results in an outward expansion, within the elastic limit of the shank material, of the end portion 31 to a diameter slightly greater than the outside diameter of the remainder of the shank 30.

The modified self-locking tubular rivet construction 35 shown in FIG. 8, differs from the improved self-locking rivet 10 shown in FIG. 4 in that the internal thread convolutions 36 nearest the counterbore 37 are of standard, substantially uniform inside and outside and pitch diameter and standard shape and pitch but continue in the form of several standard full end thread convolutions 38 as to basic cross-sectional shape and pitch and angularity of the sides of the thread relative to the axis of the thread, but of gradually decreasing inside and outside and pitch diameter to provide the desired self-locking action of the modified rivet 35. The modified construction 35 may be made in substantially the same manner as the modified construction 29 in respect of a specially ground tap and of the stepped diameter bore but has a tapered bore in its threaded end portion remote from the head. This modified rivet construction requires a special draw rod for upsetting purposes which draw rod is constructed and arranged like the draw rod shown in FIG. 6, except that the end thread convolutions 27a are of gradually decreasing inside and outside and pitch diameter but standard shape and pitch at the free end portion of the draw rod to provide for full detachable engagement thereof with all the full thread convolutions in the bore of the modified rivet 35. The modified rivet 35 like the modified rivet 29, by virtue of the gradually reduced diameter end thread convolutions, effects the desired elastic locking against the end thread convolutions of the standard threaded fastener 20.

Figure 9:
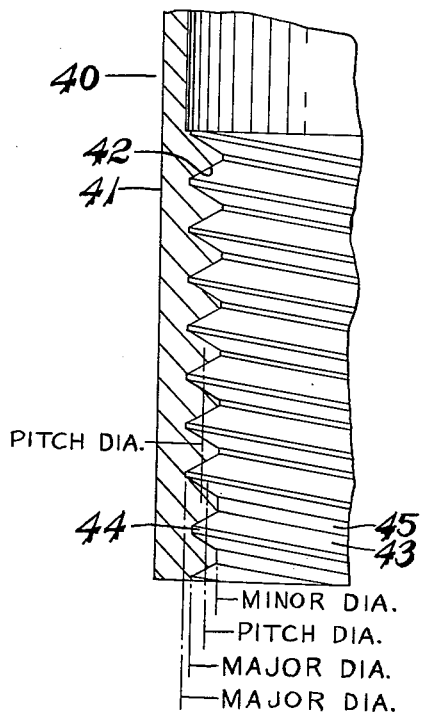
FIG. 9 is a sectional view in an enlarged scale showing another modification of the rivet shown in FIG. 4, parts being broken away.

In the embodiment shown in FIG. 9, the modified self-locking expansible rivet construction 40 is like that of the standard stock rivet 10a shown in FIG. 1 except as to the internal thread convolutions arrangement. The improved self-locking expansible tubular rivet 40 has its tubular shank of substantially uniform outside diameter throughout with a suitable stepped bore axially therethrough to provide the desired outwardly expansible portion at the counterbore and to provide a tool-engaging or fastener-engaging portion 41 along the substantially uniform, smaller diameter bore in the rivet. The tool-engaging portion 41 has a plurality of internal full thread convolutions 42 nearest the counterbore which are of standard, substantially uniform inside and outside and pitch diameter and standard shape and pitch, but continue in the form of several full end thread convolutions 43 of standard inside or minor diameter but reduced major or root diameter and reduced pitch diameter and of basic standard shape and standard angularity of the sides of the thread relative to the axis of the thread and standard pitch. However, the full end thread convolutions 43 at their major or root diameter have flat surfaces 44 which are of standard width; whereas at their minor diameter the end thread convolutions 43 have flat surfaces 45 of increased or greater than standard width.

This makes feasible full detachable engagement of all the full internal thread convolutions 42, 43 of the rivet with the external thread convolutions of a suitable special draw rod which is constructed and arranged generally like the draw rod or tool shown in FIG. 6 except that the threaded portion is of uniform diameter throughout and the end thread convolutions of the special draw rod are formed to mate with the full end thread convolutions 43 of the rivet 40 without objectionable binding. However, the full end thread convolutions 43 of the rivet 40 will bind or jam at their root diameter flat surfaces 44 and also at their sides against the full end thread convolutions of the standard threaded article-attaching fastener 20 and so provide the elastic self-locking action of the rivet 40.

The improved self-locking expansible rivet 40 can be made by the same method steps utilized to produce the standard stock rivet 10a, except as to forming the internal full thread convolutions 42, 43. Preferably, a specially ground tap of suitable construction (not shown) is inserted into the bore of the rivet blank and used to cut the standard internal full thread convolutions 42 and also the several modified standard, internal full end thread convolutions 43 in the wall of the tool-engaging portion 41 of the rivet 40.

Figure 10:
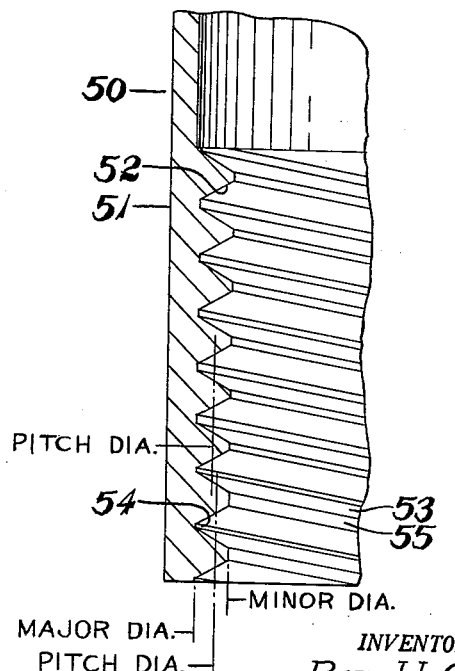
FIG. 10 is a sectional view in an enlarged scale showing still another modification of the rivet shown in FIG. 4, parts being broken away.

The modified self-locking expansible rivet 50 shown in FIG. 10 is constructed and arranged like the standard stock rivet 10a except that the internal thread convolutions arrangement is different in respect of the several full end thread convolutions. The tubular shank of the rivet 50 is of substantially uniform outside diameter throughout with a suitable stepped bore axially therethrough to provide the desired outwardly expansible portion at the counterbore and to provide a tool-engaging or fastener-engaging portion 51 at the smaller diameter bore. The substantially uniform thickness wall of the portion 51 has a plurality of internal full thread convolutions 52 nearest the counterbore which are of standard, substantially uniform inside and outside and pitch diameter and standard shape and pitch, but continue in the form of several full end thread convolutions 53 of standard minor or inside and outside or root diameter but reduced pitch diameter and of basic standard shape and standard angularity of the sides of the thread relative to the axis of the thread and standard pitch. However, the end thread convolutions 53 at their root diameter have flat surfaces 54 of less than standard or reduced width; whereas at their minor diameter the end thread convolutions 53 have flat surfaces 55 of greater than standard or increased width.

This makes feasible full detachable engagement of all the full internal thread convolutions 52, 53 of the rivet with the external thread convolutions of a suitable special draw rod which is made generally like the draw rod or tool shown in FIG. 6 except that the threaded portion is of uniform diameter throughout and end thread convolutions of the special draw rod are formed to mate with the full end thread convolutions 53 of the rivet 50 without objectionable binding. However, the full end thread convolutions 53 of the rivet 50 will bind or jam at their sides against the full end thread convolutions of the standard threaded article attaching fastener 20 thereby effecting the desired self-locking action of the rivet 50.

This improved self-locking expansible rivet 50 can be made by the same method steps used to provide the standard stock rivet 10a except as to forming the internal full thread convolutions 52, 53. Preferably, a specially ground tap of suitable construction (not shown) is inserted into the bore of the rivet blank and used to cut the standard internal full thread convolutions 52 and also the several modified standard, internal full end thread convolutions 53 in the wall of the tool-engaging portion 51 of the rivet 50.

The invention facilitates the provision of improved, internally threaded, expansible tubular rivets having self-locking thread means in their bore yet fully meeting established standard specifications especially as to the outside diameter and the length of the rivet shank and as to the total number of internal full thread convolutions for load-carrying purposes. Thus, the improved rivets of the self-locking type can be readily substituted for the standard stock rivets of the non-locking type without requiring additional changes in the work to which they are to be attached by riveting operations from one side only of the work, whereby the said improved rivets include all the advantages of the said standard stock rivets and also the further advantage of a positive acting self-locking feature to prevent objectionable retrograde movement and accidental loosening of an article-attaching standard screw fastener disposed in and threadedly engaging the improved rivet.

Variations may be made without departing from the

I claim:

1. The method of securing a structure to a tubular rivet in apertured work by operation from one side only of the work, which method comprises the steps: (a) screwing an internally threaded tubular rivet headed end first upon the externally threaded end of a draw rod thereby detachably engaging all the internal screw threads of the rivet with corresponding external screw threads on the draw rod in non-binding relation thereto, said rivet including a shank extending from said headed end with an axial bore therein providing a continuous annular wall having an internally threaded end portion spaced from said headed end an an intermediate outwardly expansible portion, the said end portion having helically continuous screw thread convolutions all of which are of uniform pitch and substantially uniform cross-sectional shape with at least one complete helically continuous end convolution of reduced pitch diameter with the same axis as the remainder of the threads, the said draw rod having at said end thereof external screw threads of at least the same number and of the same pitch and cross-sectional shape and pitch diameters as the said internal screw threads in said rivet; (b) inserting the rivet and draw rod assembly in the aperture in the work from said one side thereof with the rivet head against the work on said one side and the entire threaded portion and at least a portion of the outwardly expansible portion of the rivet on the other side of the work; (c) applying axial force to said draw rod in the direction toward the rivet head and at the same time maintaining said head seated against the work thereby axially shortening and outwardly bulging said rivet expansible portion against the other side of the work without distortion of said reduced diameter end convolution of the rivet screw threads; (d) thereafter removing said draw rod from said rivet leaving said reduced diameter end convolution undistorted; (e) inserting a structure-retaining screw through an aperture in a structure, said screw having external threads of the same pitch as those of said rivet and a pitch diameter such as to provide binding engagement with said end thread convolution of said rivet and non-binding engagement with the other thread convolutions of the rivet; and (f) then screwing said screw into said rivet until said structure is held against the head of the rivet at said one side of the work and a thread of the screw is bindingly engaged with said end thread convolution of said rivet and locked thereby against retrograde movement.

2. The method of securing a structure to a tubular rivet in apertured work by operation from one side only of the work, which method comprises the steps: (a) positioning an internally threaded headed tubular rivet in the aperture in the work with the rivet head at said one side of the work, said rivet including a shank extending from said head with an axial bore therein providing a continuous annular wall having an internally threaded end portion spaced from said head and an intermediate outwardly expansible portion, the said end portion having helically continuous screw thread convolutions all of which are of uniform pitch and substantially uniform cross-sectional shape with at least two complete helically continuous end convolutions of reduced pitch diameter with the same axis as the remainder of the threads; (b) inserting an externally threaded end of a draw rod through said rivet head and detachably engaging the external screw threads of said draw rod with all the internal screw threads of the rivet in non-binding relation thereto, the said draw rod having at said end thereof external screw threads of at least the same number and of the same pitch and cross-sectional shape and pitch diameters as the said internal screw threads in said rivet; (c) applying axial force to said draw rod in the direction toward the rivet head and at the same time maintaining said head seated against the work on said one side thereof thereby axially shortening and outwardly bulging said rivet expansible portion against the other side of the work without distortion of said two reduced diameter end convolutions of the rivet screw threads; (d) thereafter removing said draw rod from said rivet leaving said two reduced diameter end convolutions undistorted; (e) inserting a structure-retaining screw through an aperture in a structure, said screw having external threads of the same pitch as those of said rivet and a pitch diameter such as to provide binding engagement with said end thread convolutions of said rivet and non-binding engagement with the other thread convolutions of the rivet; and (f) then screwing said screw into said rivet until said structure is held against the head of the rivet at said one side of the work and two threads of the screw are bindingly engaged with said two end thread convolutions of said rivet and locked thereby against retrograde movement.

References Cited in the file of this patent

UNITED STATES PATENTS

| | | |
|---|---|---|
| 2,149,199 | Waner | Feb. 28, 1939 |
| 2,255,384 | Hood | Sept. 9, 1941 |
| 2,349,513 | Mortus | May 23, 1944 |
| 2,384,347 | Schutz | Sept. 4, 1945 |
| 2,641,378 | Wilt | June 9, 1953 |
| 2,670,021 | Torresen | Feb. 23, 1954 |
| 2,763,314 | Gill | Sept. 18, 1956 |